United States Patent [19]
Kiesel

[11] Patent Number: 5,269,537
[45] Date of Patent: Dec. 14, 1993

[54] COMPOSITE RADIAL SEAL

[75] Inventor: Mark J. Kiesel, Peoria Heights, Ill.

[73] Assignee: Caterpillar Inc., Peoria, Ill.

[21] Appl. No.: 959,955

[22] Filed: Oct. 13, 1992

[51] Int. Cl.⁵ ................................. F16J 15/32
[52] U.S. Cl. .................... 277/164; 277/165; 277/188 R; 277/205
[58] Field of Search ........... 277/152, 164, 165, 188 R, 277/188 A, 205

[56] References Cited

U.S. PATENT DOCUMENTS

| | | | |
|---|---|---|---|
| 2,757,947 | 8/1956 | Whitten | 277/205 |
| 3,271,038 | 9/1966 | Bastow | 277/205 |
| 3,601,419 | 8/1971 | Fern | 277/205 |
| 3,653,670 | 4/1972 | Sifri et al. | 277/205 X |
| 4,371,177 | 2/1983 | Bähr et al. | 277/152 |
| 4,566,702 | 1/1986 | Traub | 277/205 X |
| 4,709,932 | 12/1987 | Edlund et al. | 277/165 |
| 4,723,782 | 2/1988 | Müller | 277/165 X |
| 4,898,081 | 2/1990 | Fecher | 277/152 X |
| 5,205,568 | 4/1993 | Stoll et al. | 277/152 X |

FOREIGN PATENT DOCUMENTS

| | | | |
|---|---|---|---|
| 477462 | 10/1951 | Canada | 277/164 |
| 529112 | 8/1956 | Canada | 277/205 |
| 2458974 | 6/1976 | Fed. Rep. of Germany | 277/205 |
| 3130760 | 2/1983 | Fed. Rep. of Germany | 277/205 |
| 3619305 | 1/1987 | Fed. Rep. of Germany | 277/152 |
| 3937896 | 5/1991 | Fed. Rep. of Germany | 277/152 |
| 220266 | 11/1985 | Japan | 277/205 |
| 157877 | 7/1986 | Japan | 277/152 |
| 785167 | 10/1957 | United Kingdom | 277/152 |
| 1466733 | 3/1977 | United Kingdom | 277/152 |
| 2242713 | 10/1991 | United Kingdom | 277/152 |

*Primary Examiner*—William A. Cuchlinski, Jr.
*Assistant Examiner*—Scott W. Cummings
*Attorney, Agent, or Firm*—O. Gordon Pence

[57] ABSTRACT

A composite radial seal for sealing the rod end of a hydraulic cylinder or suspension strut is disclosed. The composite seal includes a high abrasion resistant elastomeric seal ring having an elongated body. The body has a pressure end and a non-pressure end, with the pressure end having a U-cup configuration and a first dynamic seal lip and the non-pressure end having an enclosed annular cavity and a second dynamic seal lip. The cavity contains and is filled with a highly resilient energizer ring. Seal also includes an integral anti-extrusion ring that is bonded to the non-pressure end of the seal ring body adjacent and on the non-pressure side of the second seal lip to prevent extrusion of the seal lip into a clearance gap between a rod and a head of the cylinder or strut.

16 Claims, 2 Drawing Sheets

5,269,537

COMPOSITE RADIAL SEAL

TECHNICAL FIELD

The present invention relates generally to seals for sealing hydraulic cylinder rods and the like and more particularly to an improved composite radial seal for such use.

BACKGROUND ART

U-cup radial seals have been used for many years in high pressure applications, such as hydraulic cylinders, suspension struts and the like, to seal around the reciprocating rods of such cylinders or struts and prevent the escape of hydraulic fluid. Such U-cup seals come in many shapes and styles and have included separate elements that have contributed to their sealing ability. For instance, some use separate energizer springs, in the form of rubber O-rings or the like. Such rubber springs are typically located between the legs of the U-cup seal. Because such rubber O-ring springs are exposed to the hydraulic fluid in the cylinder, the selection of rubber material is dictated by its compatibility to the hydraulic fluid. As a result, its functional characteristics as a spring may suffer in such selection. Also, dynamic pressures on and movements of the seal can dislodge the rubber spring from its intended position and reduce its effectiveness. Other U-cup seals have been utilized with separate anti-extrusion rings, which are intended to prevent the seal lips of the seal from extruding into the annular gap between the cylinder rod and the cylinder housing or head as the result of the high pressures in the cylinder or the reciprocating movement of the rod. However, such separate anti-extrusion rings may be assembled in the wrong location or inadvertently left out during assembly. Other U-cup seals are provided with two axially spaced seal lips. High fluid pressure may become entrapped between these two lips. This can result in fluid loss due to leakage past the second seal lip on the non-pressure side of the seal.

The present invention is directed to overcoming shortcomings of the prior U-cup seals with respect to separate components to obtain improved sealing performance and to fluid loss problems.

DISCLOSURE OF THE INVENTION

In accordance with one aspect of the present invention, a composite radial seal for sealing about a rod a hydraulic device is provided with a high abrasion resistant elastomeric seal ring having an elongated body. The body has a pressure end and a non-pressure end, with the pressure end having a U-cup configuration and a first dynamic seal lip and the non-pressure end having an enclosed annular cavity and a second dynamic seal lip. The cavity contains and is filled with a highly resilient energizer ring. Seal also includes an integral anti-extrusion ring that is bonded to the non-pressure end of the seal ring body adjacent and on the non-pressure side of the second seal lip to prevent extrusion of the seal lip into a clearance gap between a rod and a head of the hydraulic device.

BEST MODE FOR CARRYING OUT THE INVENTION

Figure 1:
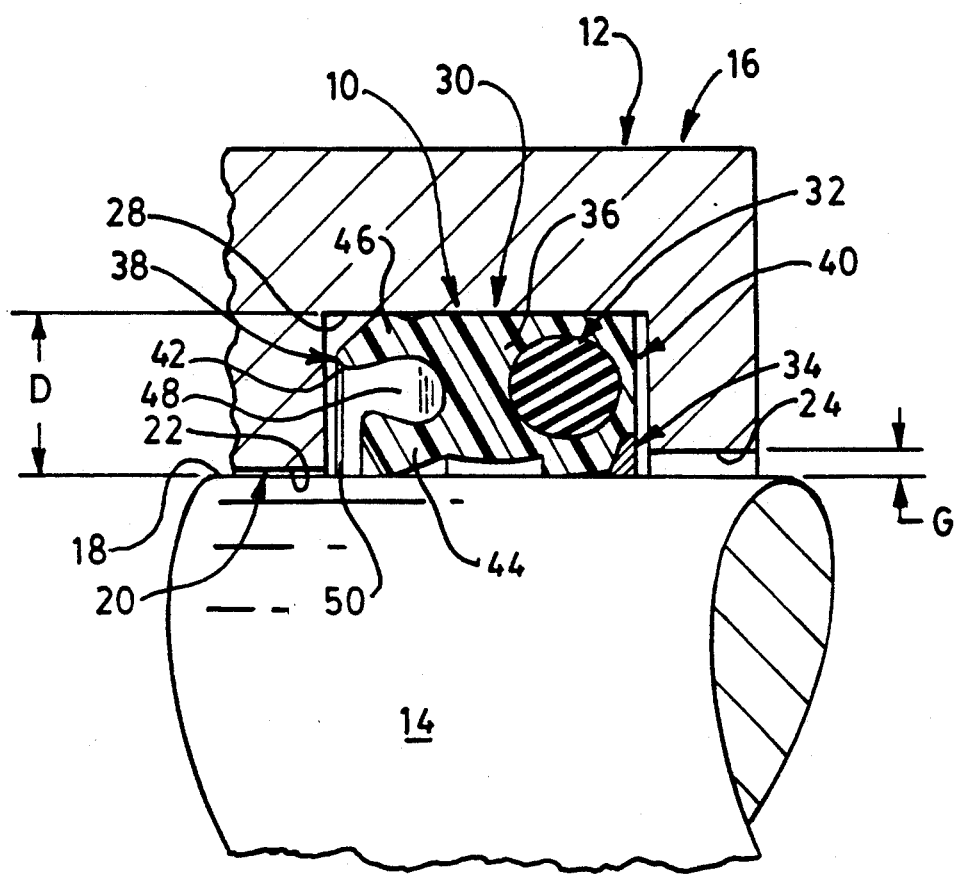
FIG. 1 is a fragmentary cross-sectional view of a portion of a hydraulic suspension strut illustrating a composite radial seal embodying the principles of the present invention.

Referring more particularly to the drawings, a composite radial seal embodying the principles of the present invention is generally indicated at 10 in FIG. 1 and is of a type for sealing the rod end of a hydraulic device, such as a suspension strut partially shown in cross-section at 12. Strut 12 includes a cylindrical rod 14 and an annular head 16. The rod 14 has an outer sealing surface 18. Sealing surface 18 is suitably finished, as by chrome plating, in order to provide it with a smooth surface texture, high hardness and corrosion resistance. Head 16 has a stepped bore 20 for receiving the rod therethrough. Stepped bore 20 has bearing portion 22, having a close fit relation with the rod, and a clearance portion 24, having a somewhat larger diameter to eliminate its contact with the sealing surface 18 of the rod 14, as it is on the non-pressure side of the seal 10. A predetermined clearance gap "G" is thereby created between the sealing surface 18 of the rod 14 and the clearance portion 24. Head 16 also includes an annular groove 28 located between the bearing and clearance portions 22,24 of the stepped bore 20 for mounting the seal 10.

Figure 2:
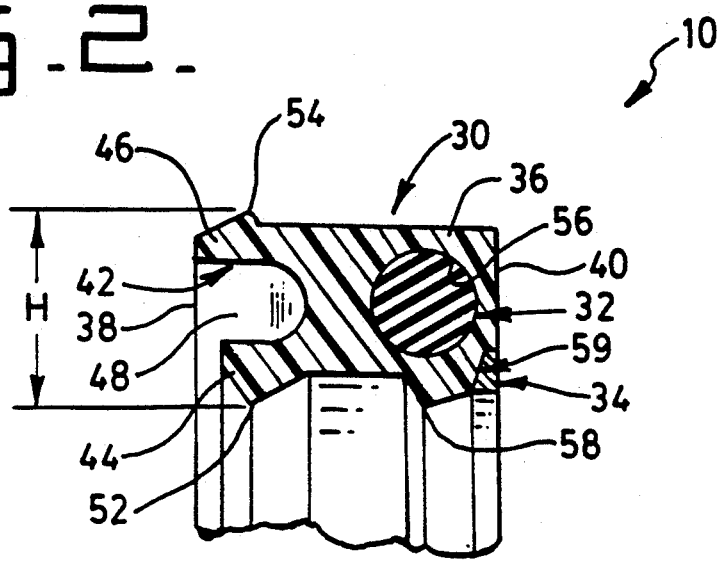
FIG. 2 is a transverse cross-sectional view of the composite seal by itself and showing the seal in a free state.

As best shown in FIG. 2, the composite seal 10 includes a high abrasion resistant elastomeric seal ring 30, a highly resilient energizer ring 32 and an integral anti-extrusion ring 34.

Seal ring 30 has an elongated body 36 having a pressure end 38 and a non-pressure end 40, the pressure end 38 being the end exposed to fluid pressure in the suspension strut 12 and the non-pressure end 40 being the end exposed to atmospheric pressure through the clearance gap "G".

The pressure end 38 is provided with a U-cup configuration 42 with an inner axially extending leg 44 and an outer axially extending leg 46 that are separated by an annular pressure cavity 48 that is open to the groove 28 (FIG. 1). The inner leg 44 is formed shorter than the outer leg 46 to provide an annular passage 50 to the pressure cavity 48 for communicating fluid pressure in the strut 12 to the cavity 48. Referring again to FIG. 2, the inner leg 44 is equipped with a first dynamic seal lip 52 that protrudes radially inwardly therefrom for dynamic sealing engagement against the sealing surface 18 of the rod 14. The outer leg 46 is provided with a static seal lip 54 for static sealing engagement against the groove 28.

The non-pressure end 40 is provided with an enclosed annular cavity 56 and a second dynamic sealing lip 58 that protrudes radially inwardly therefrom for dynamic sealing engagement against the sealing surface 18 of the rod 14 in a similar fashion to the first lip 52.

The energizer ring 32 fills and is sealed within the enclosed cavity 56 of the non-pressure end 40. Ring 32 may be encased inside the cavity 56 during the molding process of the seal ring 30 or by any other suitable means known in the art.

In the embodiment illustrated in FIGS. 1 and 2, the anti-extrusion ring 34 is carried on the non-pressure end 40 of the seal ring body 36 adjacent to and on the non-pressure side of the second seal lip 58, in essence, at an inner corner 59 of the body 36 which may be notched to receive the ring 34. The anti-extrusion ring 34 is secured to the ring body 36 by bonding so as to be an integral part thereof. Ring 34 is constructed with an inside diameter that is only slightly greater than the diameter of the rod 14 and an outside diameter that is marginally greater than the clearance portion 24 of the bore 20 of the head 16 so as to span the gap "G". Such outside diameter, however, is not so great as to prevent the mounting of the seal 10 into the groove 28 with the limited flexure afforded by the anti-extrusion ring 34. The described construction of the anti-extrusion ring 34 is able to provide backup to the second lip 58 in order to prevent the lip 58 from being extruded into the gap "G" as the result of high fluid pressure in the strut 12 and/or the reciprocating movement of the rod 14.

Figure 3:
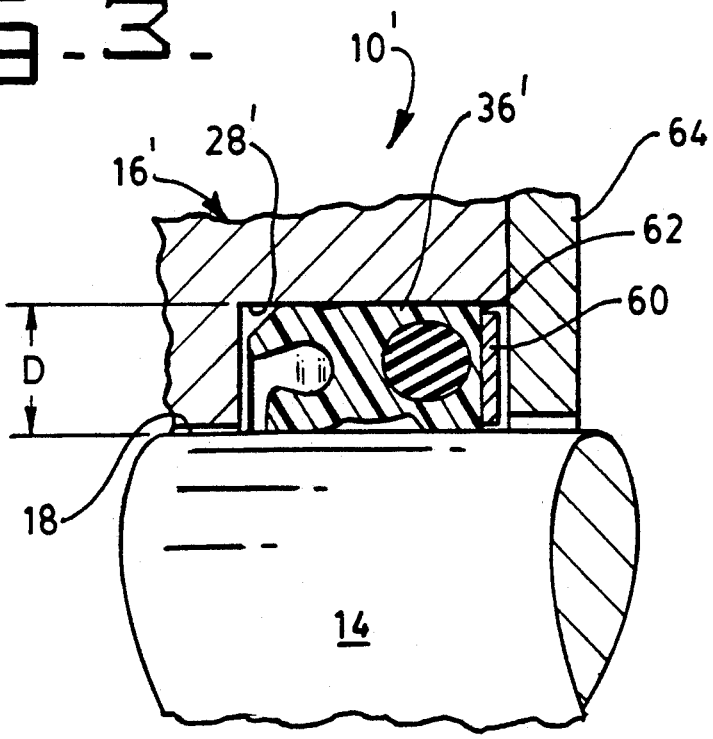
FIG. 3 is a view similar to FIG. 1, but illustrating an alternate embodiment of the composite seal.

FIG. 3 illustrates another embodiment of the present invention wherein a composite radial seal 10' is provided with a full anti-extrusion ring 60 that is bonded to an end surface 62 of the seal ring body 36'. The full ring 60 illustrated in this embodiment may by used when a detachable end cap 64 is employed on the head 16' of the strut 12 so as to permit the installation of the seal 10' into an open ended groove 28'.

It should be noted that the seal 10 or 10' have a radial cross-section height "H" in a free state, as shown in FIG. 2, that is greater than the radial distance "D" between the sealing surface 18 of the rod 14 and the bottom of the groove 28. Thus, when the seal 10 is in its operating position in the strut 12, as shown in FIG. 1, it is in a compressed state. In particular, the energizer ring 32 is loaded to exert a predetermined compressive force on the second seal lip 58.

Industrial Applicability

The seal 10 constructed in accordance with the teachings of the present invention advantageously provides superior sealing and longer wear life in high hydraulic pressure applications, such as found in hydraulic cylinders and hydraulic suspension struts used on large earthmoving vehicles, such as tractors, loaders, excavators, off-highway trucks and the like.

As is apparent from the above description and the drawings, seal 10 or 10' have means for pressure energizing the first dynamic seal lip 52 and means for compression energizing the second dynamic seal lip 58. The pressure energizing means is afforded by the U-cup configuration of the pressure end 38, as is well known in the art. Communication of fluid pressure into the pressure cavity 48 is ensured in the present seal 10 or 10' by means of the annular passage 50. During operation of the strut 12, fluid pressure levels in the strut will fluctuate, as will be appreciated by those skilled in the art. As a consequence, the pressure energizing means will exert a variable force on the seal lips 52 and 54, depending on the fluid pressure levels existing the the strut 14 from time to time.

The compression energizing means is afforded by the energizer ring 32 that acts solely on the second dynamic seal lip 58 and applies a predetermined constant force on such second seal lip 58. This constant force is preferably selected to be greater than the force exerted on the first seal lip 52 when the fluid pressure in the strut is below a preselected minimum level. One particular advantage that is achieved by this arrangement is that any high pressure fluid that becomes entrapped between the first and second lips 52 and 58 will be vented back into the strut 12 past the first lip 52 when the fluid pressure in the strut decreases below the selected minimum level, rather than escaping past the second lip 58, thereby reducing fluid loss from the strut 12.

Another advantage of the present invention is that the energizer ring 32 is completely encapsulated within the seal ring 30. Because of this, the energizer ring 32 is not exposed to the hydraulic fluid in the strut or cylinder. This permits the selection of the material of the energizer ring 32 to be based solely on its spring characteristics, and not on its compatibility with the hydraulic fluid. As a result, a softer elastomeric material, with a low compression set and high resilience that is maintained over a wide temperature band, can be used. A material, such as silicone rubber, with a hardness of less than 90 Shore A durometer is preferred.

Likewise, the selection of the material for the seal ring 30 can be based on its sealing and abrasion resistance characteristics, and less so on its compression set and resiliency characteristics, as the latter functions are provided by the energizer ring 32. As a consequence, a harder, tougher, and higher abrasion resistant material can be used for the seal ring 30. Preferably, the seal ring 30 is of a material with a hardness of about 40 to 80 Shore D durometer. One such material is polyurethane, as is well known in the art.

Lastly, the selection of the material for the anti-extrusion ring 34 can be based on its rigidity and bending strength in functioning to prevent the extrusion of the seal ring 30 into the gap "G". The ring 34 employed in the first embodiment depicted in FIGS. 1 and 2 must also be sufficiently elastically deformable to permit the seal 10 to be installed in the groove 28. Materials, such as polyarylsulfone or nylon, with a flex modulus of around 400,000 p.s.i. are preferred for the anti-extrusion ring 34.

Other aspects, objects and advantages of the present invention can be obtained for a study of the drawings, the disclosure and the appended claims.

I claim:
1. A composite radial seal, comprising:
   a high abrasion resistant elastomeric seal ring having an elongated body, said body having a pressure end and a non-pressure end, said pressure end having a U-cup configuration and a first dynamic seal lip protruding radially inwardly therefrom and said non-pressure end having an enclosed annular cavity and a second dynamic seal lip protruding radially inwardly therefrom;
   a highly resilient energizer ring filling and sealed within said enclosed cavity; and
   an integral anti-extrusion ring carried on said non-pressure end of said seal ring adjacent and on the non-pressure side of said second seal lip.

2. The seal of claim 1 wherein said energizer ring is of a silicone rubber having a low compression set and a hardness of less than 90 Shore A durometer.

3. The seal of claim 2 wherein said anti-extrusion ring is of a hard plastic material with a flex modulus of about 400,000 p.s.i.

4. The seal of claim 3 wherein said U-cup configuration provides an inner axially extending leg and an outer axially extending leg that are separated by an annular pressure cavity, said inner leg being shorter than said outer leg to provide an annular passage to said pressure cavity.

5. The seal of claim 4 wherein said first seal lip is formed on said inner leg and said outer leg has a radially outwardly extending static seal lip seal formed thereon.

6. The seal of claim 5 wherein said non-pressure end of said seal body has an inner corner and said anti-extrusion ring is located at and localized to the inner corner of said non-pressure end.

7. The seal of claim 5 wherein said non-pressure end has a radial end surface and wherein said anti-extrusion ring is located along and extends generally the full length of said end surface.

8. A composite radial seal for sealing about a reciprocating rod of a hydraulic device, comprising:
   a high abrasion resistant elastomeric seal ring having an elongated body, said body having a pressure end and a non-pressure end, said pressure end having a first dynamic seal lip protruding radially inwardly therefrom and said non-pressure end having a second dynamic seal lip protruding radially inwardly therefrom;
   means for pressure energizing said first seal lip, said means including a U-cup configuration at said pressure end; and
   means for compression energizing said second lip, said compression energizing means including an enclosed cavity in said non-pressure end and a highly resilient energizer ring filling and sealed within said enclosed cavity.

9. The seal of claim 8 including an integral anti-extrusion ring carried on said non-pressure end of said seal ring adjacent and on the non-pressure side of said second seal lip.

10. The seal of claim 9 wherein said hydraulic device contains fluid pressure that fluctuates from a high pressure level to a low pressure level and said pressure energizing means exerts a variable force on said first seal lip in proportion to said fluid pressure level, and wherein said energizer ring exerts a predetermined constant force on said second seal lip, said constant force being greater than the force exerted on said first seal lip when the fluid pressure in said device is below a predetermined minimum level.

11. The seal of claim 10 wherein said energizer ring is of a silicone rubber having a low compression set and a hardness of less than 90 Shore A durometer.

12. The seal of claim 11 wherein said anti-extrusion ring is of a hard plastic material with a flex modulus of about 400,000 p.s.i.

13. The seal of claim 12 wherein said U-cup configuration provides an inner axially extending leg and an outer axially extending leg that are separated by an annular pressure cavity, said inner leg being shorter than said outer leg to provide an annular passage to said pressure cavity.

14. The seal of claim 13 wherein said first seal lip is formed on said inner leg and said outer leg has a radially outwardly extending static seal lip formed thereon.

15. The seal of claim 14 wherein said non-pressure end of said seal body has an inner corner and said anti-extrusion ring is located at and localized to the inner corner of said non-pressure end.

16. The seal of claim 14 wherein said non-pressure end has a radial end surface and wherein said anti-extrusion ring is located along and extends generally the full length of said end surface.

* * * * *